(12) United States Patent
Kim et al.

(10) Patent No.: US 12,409,792 B2
(45) Date of Patent: Sep. 9, 2025

(54) VEHICLE AND METHOD OF CONTROLLING THE SAME

(71) Applicants: Hyundai Motor Company, Seoul (KR); Kia Corporation, Seoul (KR)

(72) Inventors: Hyunsang Kim, Gyeonggi-do (KR); Yun Sup Ann, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 143 days.

(21) Appl. No.: 18/078,168

(22) Filed: Dec. 9, 2022

(65) Prior Publication Data

US 2023/0406101 A1     Dec. 21, 2023

(30) Foreign Application Priority Data

Jun. 17, 2022     (KR) .................. 10-2022-0074343

(51) Int. Cl.
*H04N 5/265*     (2006.01)
*B60K 35/00*     (2006.01)
(Continued)

(52) U.S. Cl.
CPC .............. *B60K 35/00* (2013.01); *B60R 1/008* (2013.01); *B60R 11/04* (2013.01); *G06T 7/70* (2017.01); *H04N 5/2628* (2013.01); *H04N 5/265* (2013.01); *H04N 5/268* (2013.01); *H04N 23/90* (2023.01); *H04R 1/406* (2013.01); *H04R 3/005* (2013.01); *B60K 35/81* (2024.01); *B60K 2360/21* (2024.01); *B60R 2011/0003* (2013.01); *G06T 2207/20132* (2013.01);
(Continued)

(58) Field of Classification Search
CPC .... B60K 35/00; B60K 35/81; B60K 2360/21; B60K 2360/176; B60K 35/22; B60K 35/28; B60R 1/008; B60R 11/04; B60R 2011/0003; B60R 1/00; B60R 2300/105; B60R 2300/20; G06T 7/70; G06T 2207/20132; G06T 2207/30201; G06T 2207/30268; G06T 3/40; G06T 7/11; G06T 2210/22; H04N 5/2628; H04N 5/265; H04N 5/268; H04N 23/90; H04R 1/406; H04R 3/005; H04R 2201/401; H04R 2499/13; B60W 50/14; B60W 40/02; B60W 40/08; B60W 2040/0881; B60W 2050/143; B60W 2050/146; B60W 2420/403; G06F 3/1423
See application file for complete search history.

(56) References Cited

U.S. PATENT DOCUMENTS 11,453,365 B2 *   9/2022  Julian ................... G06F 9/451
2002/0003571 A1 * 1/2002  Schofield .............. B60R 1/04
                                                348/148
(Continued)

*Primary Examiner* — Timothy R Newlin
(74) *Attorney, Agent, or Firm* — Fox Rothschild LLP

(57) ABSTRACT

A vehicle, which includes a display and enables a driver to easily observe an occupant in a rear seat, includes a rear camera configured to acquire a rear image and having a visual field directed toward a rear side of the vehicle, a display part configured to display the rear image, at least one rear-seat camera configured to acquire at least one rear-seat image and each having a visual field directed toward the rear seat of the vehicle, and a controller configured to control the display part to display all the rear image and the at least one rear-seat image on the basis that a preset condition is satisfied.

16 Claims, 7 Drawing Sheets

(51) Int. Cl.
  *B60R 1/00* (2022.01)
  *B60R 11/04* (2006.01)
  *G06T 7/70* (2017.01)
  *H04N 5/262* (2006.01)
  *H04N 5/268* (2006.01)
  *H04N 23/90* (2023.01)
  *H04R 1/40* (2006.01)
  *H04R 3/00* (2006.01)
  *B60K 35/81* (2024.01)
  *B60R 11/00* (2006.01)

(52) U.S. Cl.
  CPC .............. *G06T 2207/30201* (2013.01); *G06T 2207/30268* (2013.01); *H04R 2201/401* (2013.01); *H04R 2499/13* (2013.01)

(56) References Cited

U.S. PATENT DOCUMENTS

| | | | | |
|---|---|---|---|---|
| 2006/0083390 A1* | 4/2006 | Kaderavek | ............ | H04R 1/406 381/91 |
| 2007/0053524 A1* | 3/2007 | Haulick | ................ | H04M 9/082 381/86 |
| 2007/0280486 A1* | 12/2007 | Buck | ....................... | H04S 7/301 381/92 |
| 2015/0085121 A1* | 3/2015 | Englander | ............... | G06F 3/165 348/148 |
| 2015/0251538 A1* | 9/2015 | Tamura | .................. | B60K 35/00 340/461 |
| 2016/0082888 A1* | 3/2016 | Kothari | .................. | B60J 3/0204 348/148 |
| 2016/0196098 A1* | 7/2016 | Roth | ....................... | G09G 5/00 715/761 |
| 2017/0013188 A1* | 1/2017 | Kothari | .................. | H04N 7/181 |
| 2017/0174137 A1* | 6/2017 | Kawaguchi | ............. | G09G 5/14 |
| 2017/0297496 A1* | 10/2017 | Onaka | .................... | G06V 20/56 |
| 2017/0371156 A1* | 12/2017 | Heishi | ................... | H04N 23/90 |
| 2020/0223362 A1* | 7/2020 | Witte | ..................... | H04N 23/54 |
| 2020/0283010 A1* | 9/2020 | Miyake | ................... | G06V 40/20 |
| 2022/0242695 A1* | 8/2022 | Ackermann | ............ | B66B 1/463 |
| 2022/0400343 A1* | 12/2022 | Abe | ........................ | G06V 20/59 |
| 2022/0402517 A1* | 12/2022 | Sicconi | .................. | B60W 40/08 |
| 2024/0098464 A1* | 3/2024 | Foy | ........................ | G06F 3/0481 |
| 2024/0149885 A1* | 5/2024 | Barcia | ................... | H04W 76/50 |

\* cited by examiner

VEHICLE AND METHOD OF CONTROLLING THE SAME

CROSS-REFERENCE TO RELATED APPLICATION

This application claims under 35 U.S.C. § 119(a) the benefit of priority to Korean Patent Application No. 10-2022-0074343, filed on Jun. 17, 2022, in the Korean Intellectual Property Office, the disclosure of which is incorporated herein by reference.

TECHNICAL FIELD

The present disclosure relates to a vehicle including a display configured to selectively display a rear-seat occupant and a method of controlling the same.

BACKGROUND

In general, a vehicle may be equipped with side mirrors and a room mirror that enable a driver to identify left and right sides of a traveling road or a rear road situation. The side mirrors may be attached to two opposite sides of a vehicle body. While driving the vehicle, the driver recognizes a traveling direction or speed of another vehicle that travels behind the host vehicle through the side mirrors while watching the front side and the left and right sides, such that the drive may safely change lanes.

A room mirror (or a rear-view mirror), which may be called an inside mirror, may be positioned in the vehicle and reflects light introduced from a rear side of the vehicle, thereby allowing the driver to recognize a situation of the rear side of the vehicle when the driver drives the vehicle or moves the vehicle rearward to park the vehicle. Therefore, the room mirror performs several functions essential for safety driving.

However, because of various types of objects disposed on a rear seat of the vehicle and a limitation in size of a rear glass, the driver often cannot easily recognize a rear road situation through the room mirror.

Recently, with the development of a camera monitor system, the problem may be solved by displaying a rear image, which may be obtained by a rear camera, on an electronic room mirror including a display.

However, the electronic room mirror may be merely used to observe a situation of a rear road.

SUMMARY

An embodiment of the disclosure may be to provide a vehicle and a method of controlling the same, which may be capable of enabling a driver to easily observe an occupant in a rear seat by using a display.

In accordance with an embodiment of the disclosure, a vehicle includes: a rear camera configured to acquire a rear image and having a visual field directed toward a rear side of the vehicle; a display part configured to display the rear image; one or more rear-seat cameras configured to acquire one or more rear-seat images and each having a visual field directed toward a rear seat of the vehicle; and a controller configured to control the display part to display all the rear image and the one or more rear-seat images on the basis that a preset condition may be satisfied.

In addition, the controller may be further configured to control the display part to display all the rear image and the one or more rear-seat images on the basis that a rear-seat observation function may be turned on in accordance with a user input.

In addition, the controller may be further configured to crop a face image of an occupant from the one or more rear-seat images and control the display part to display the face image of the occupant when the occupant seated in the rear seat may be detected from the one or more rear-seat images.

In addition, the vehicle may further include: one or more microphones, in which the controller may be further configured to identify a position of a speaker in the vehicle on the basis of at least one of the one or more rear-seat images or audio data received from the one or more microphones.

In addition, the controller may be further configured to control the display part to display all the rear image and the one or more rear-seat images when the speaker may be identified as being positioned in the rear seat.

In addition, the one or more rear-seat cameras may include: a left-rear-seat camera configured to acquire a left-rear-seat image and having a visual field directed toward a left rear seat; and a right-rear-seat camera configured to acquire a right-rear-seat image and having a visual field directed toward a right rear seat, the controller may be further configured to control the display part to display the left-rear-seat image on the basis that the speaker may be identified as being positioned in the left rear seat, and the controller may be further configured to control the display part to display the right-rear-seat image on the basis that the speaker may be identified as being positioned in the right rear seat.

In addition, the controller may be further configured to control the display part to display the left-rear-seat image and the right-rear-seat image, the controller may be further configured to control the display part to increase a size of the left-rear-seat image on the basis that the speaker may be identified as being positioned in the left rear seat, and the controller may be further configured to control the display part to increase a size of the right-rear-seat image on the basis that the speaker may be identified as being positioned in the right rear seat.

In addition, the controller may be further configured to crop a face image of a first occupant positioned in a left rear seat and a face image of a second occupant positioned in a right rear seat from the one or more rear-seat images, the controller may be further configured to control the display part to display the face image of the first occupant on the basis that the speaker may be identified as being positioned in the left rear seat, and the controller may be further configured to control the display part to display the face image of the second occupant on the basis that the speaker may be identified as being positioned in the right rear seat.

In addition, the controller may be further configured to crop a face image of a first occupant positioned in a left rear seat and a face image of a second occupant positioned in a right rear seat from the one or more rear-seat images, the controller may be further configured to control the display part to display the face image of the first occupant and the face image of the second occupant, the controller may be further configured to control the display part to increase a size of the face image of the first occupant on the basis that the speaker may be identified as being positioned in the left rear seat, and the controller may be further configured to control the display part to increase a size of the face image of the second occupant on the basis that the speaker may be identified as being positioned in the right rear seat.

In addition, the controller may be further configured to control the display part to stop an output of the one or more rear-seat images on the basis that a warning signal may be received from a driver assist system while the display part displays all the rear image and the one or more rear-seat images.

In accordance with another embodiment of the disclosure, a method of controlling a vehicle includes: receiving a rear image from a rear camera having a visual field directed toward a rear side of the vehicle; displaying the rear image on a display part; receiving one or more rear-seat images from one or more rear-seat cameras each having a visual field directed toward a rear seat of the vehicle; and controlling the display part to display all the rear image and the one or more rear-seat images on the basis that a preset condition may be satisfied.

In addition, the controlling of the display part to display all the rear image and the one or more rear-seat images may include controlling the display part to display all the rear image and the one or more rear-seat images on the basis that a rear-seat observation function may be turned on in accordance with a user input.

In addition, the controlling of the display part to display all the rear image and the one or more rear-seat images may include cropping a face image of an occupant from the one or more rear-seat images and controlling the display part to display the face image of the occupant when the occupant seated in the rear seat may be detected from the one or more rear-seat images.

In addition, the method may further include: identifying a position of a speaker in the vehicle on the basis of at least one of the one or more rear-seat images or audio data received from one or more microphones.

In addition, the controlling of the display part to display all the rear image and the one or more rear-seat images may include controlling the display part to display all the rear image and the one or more rear-seat images when the speaker may be identified as being positioned in the rear seat.

In addition, the one or more rear-seat cameras may include: a left-rear-seat camera configured to acquire a left-rear-seat image and having a visual field directed toward a left rear seat; and a right-rear-seat camera configured to acquire a right-rear-seat image and having a visual field directed toward a right rear seat, and the controlling of the display part to display all the rear image and the one or more rear-seat images may include: controlling the display part to display the left-rear-seat image on the basis that the speaker may be identified as being positioned in the left rear seat; and controlling the display part to display the right-rear-seat image on the basis that the speaker may be identified as being positioned in the right rear seat.

In addition, the controlling of the display part to display all the rear image and the one or more rear-seat images may include: controlling the display part to display the left-rear-seat image and the right-rear-seat image; controlling the display part to increase a size of the left-rear-seat image on the basis that the speaker may be identified as being positioned in the left rear seat; and controlling the display part to increase a size of the right-rear-seat image on the basis that the speaker may be identified as being positioned in the right rear seat.

In addition, the controlling of the display part to display all the rear image and the one or more rear-seat images may include: cropping a face image of a first occupant positioned in a left rear seat and a face image of a second occupant positioned in a right rear seat from the one or more rear-seat images; controlling the display part to display the face image of the first occupant on the basis that the speaker may be identified as being positioned in the left rear seat; and controlling the display part to display the face image of the second occupant on the basis that the speaker may be identified as being positioned in the right rear seat.

In addition, the controlling of the display part to display all the rear image and the one or more rear-seat images may include: cropping a face image of a first occupant positioned in a left rear seat and a face image of a second occupant positioned in a right rear seat from the one or more rear-seat images; controlling the display part to display the face image of the first occupant and the face image of the second occupant; controlling the display part to increase a size of the face image of the first occupant on the basis that the speaker may be identified as being positioned in the left rear seat; and controlling the display part to increase a size of the face image of the second occupant on the basis that the speaker may be identified as being positioned in the right rear seat.

In addition, the method may further include: controlling the display part to stop an output of the one or more rear-seat images on the basis that a warning signal may be received from a driver assist system while the display part displays all the rear image and the one or more rear-seat images.

BRIEF DESCRIPTION OF THE DRAWINGS

These and/or other embodiments of the disclosure will become apparent and more readily appreciated from the following description of the embodiments, taken in conjunction with the accompanying drawings of which:

FIG. 6 is a view illustrating various examples of screens displayed on the room mirror in a state in which a rear-seat observation function is turned on.

FIG. 7 is a view illustrating various examples of screens displayed on the room mirror in a state in which a selective rear-seat observation function is turned on.

DETAILED DESCRIPTION

Figure 1:
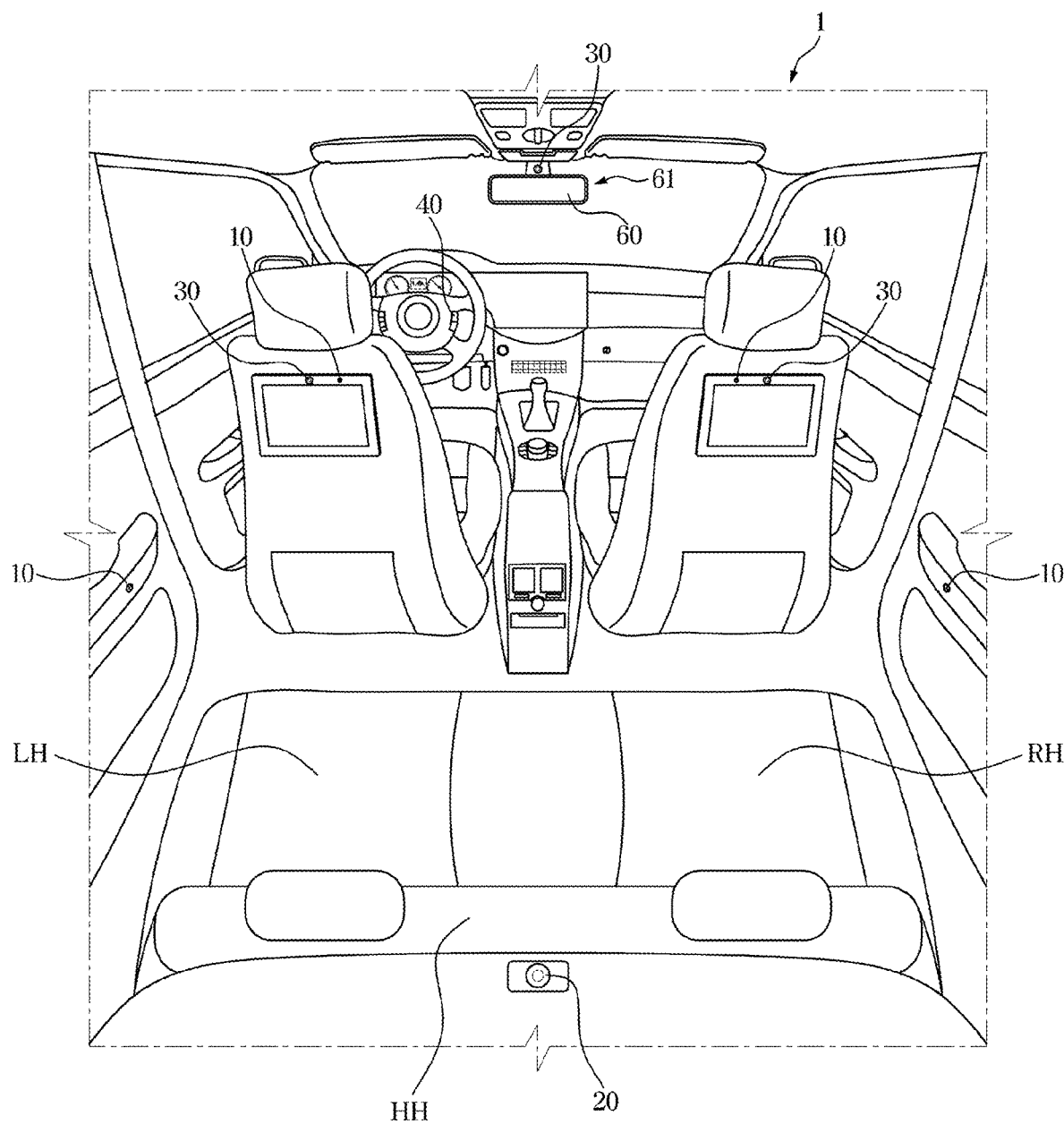
FIG. 1 is a view illustrating a configuration of a vehicle according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Advantages and features of the present disclosure and devices and methods for achieving the advantages and features will be clear with reference to embodiments described in detail below together with the accompanying drawings. However, the present disclosure may not be limited to the embodiments disclosed herein but will be implemented in various forms. The embodiments of the present disclosure may be provided so that the present disclosure may be completely disclosed, and a person with ordinary skill in the art may fully understand the scope of the present disclosure. The present disclosure will be defined only by the scope of the appended claims.

The teens used in the present specification will be briefly described, and the present disclosure will be specifically described.

The terms used in the present disclosure may be selected from general terms currently widely used in the art in consideration of functions in the present disclosure, but the terms may vary according to the intention of those skilled in the art, precedents, or new technology in the art. Also, specified terms may be selected arbitrarily by the applicant, and in this case, the detailed meaning thereof will be described in the detailed description of the disclosure. Thus, the terms used in the present disclosure should be defined based on not simple names but the meaning of the terms and the overall description of the present disclosure.

Throughout the specification, unless explicitly described to the contrary, the word "comprise/include" and variations such as "comprises/includes" or "comprising/including" will be understood to imply the further inclusion of stated elements but not the exclusion of any other elements. In addition, the term 'unit', 'part', or 'portion' used in the present specification means a hardware component such as software, FPGA, or ASIC, and the 'unit', 'part', or 'portion' performs certain functions. However, the term 'unit', 'part', or 'portion' may not be limited to software or hardware. The term 'unit', 'part', or 'portion' may be configured to be in an addressable storage medium or configured to reproduce one or more processors. Thus, as an example, the term 'unit', 'part', or 'portion' includes components such as software components, object-oriented software components, class components, and task components, processes, functions, properties, procedures, subroutines, segments of program codes, drivers, firmware, microcode, circuitry, data, database, data structures, tables, arrays, and variables. The functions provided in the components, 'units', 'parts', and 'portions' may be combined into a smaller number of components, 'units', 'parts', and 'portions' and/or divided into additional components, 'units', 'parts', and 'portions'.

Hereinafter, embodiments of a vehicle and a method of controlling the same will be described in detail with reference to the accompanying drawings so that those with ordinary skill in the art to which the present disclosure pertains may easily carry out the embodiments. Further, a part irrelevant to the description will be omitted to clearly describe the present disclosure with reference to the drawings. In addition, in the drawings, like reference numeral indicates like constituent element, and a repeated description thereof will be omitted.

Figure 2:
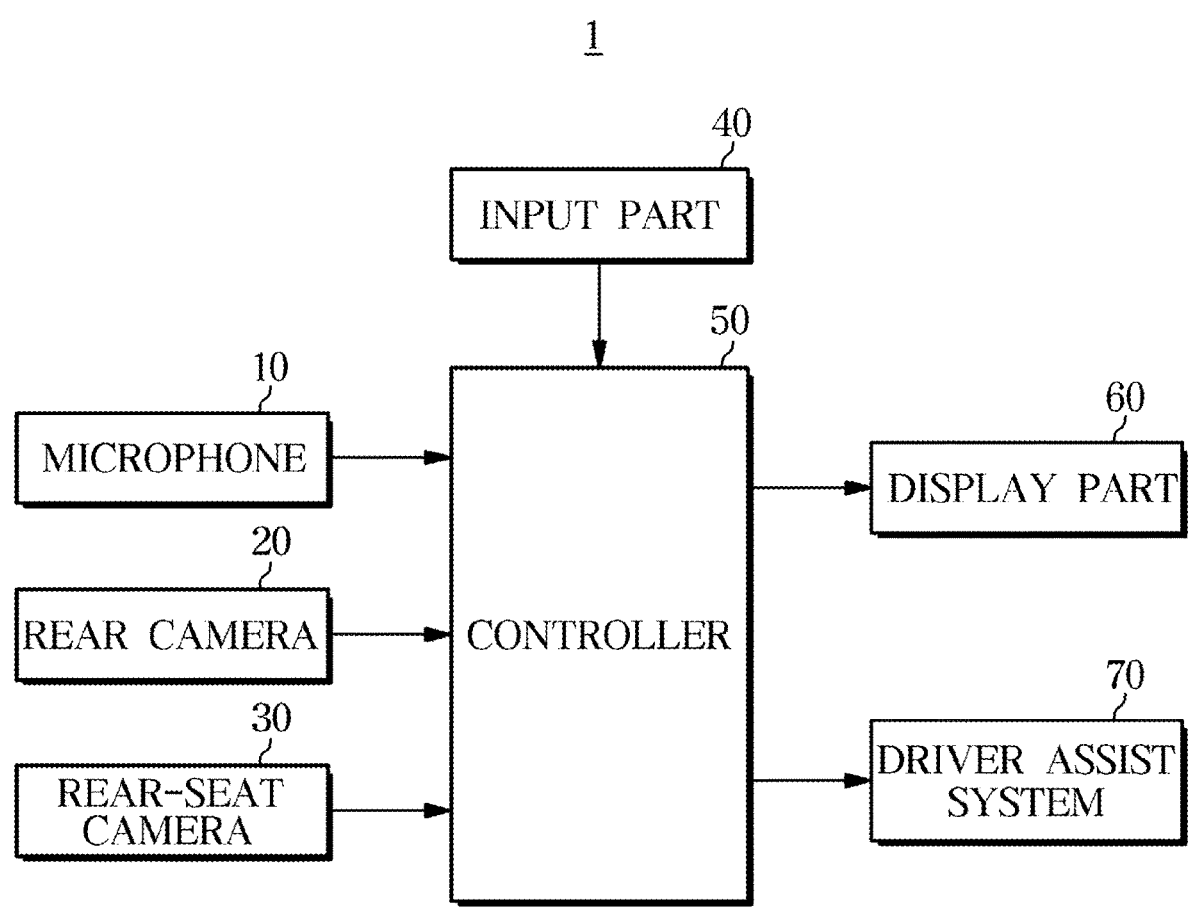
FIG. 2 is a block diagram illustrating a configuration of the vehicle according to the embodiment.

FIG. 1 is a view illustrating a configuration of a vehicle according to the embodiment, and FIG. 2 is a block diagram illustrating a configuration of a vehicle 1 according to the embodiment.

Referring to FIGS. 1 to 2, the vehicle 1 according to the embodiment may include one or more microphones 10, a rear camera 20, one or more rear seat cameras 30, an input part 40, a controller 50, a display part 60, and a driver assist system 70.

The one or more microphones 10 may be provided in the vehicle 1. The microphone 10 may receive sound generated in the vehicle 1 and output the sound as an electrical signal.

Therefore, the one or more microphones 10 may acquire audio data corresponding to the sound generated in the vehicle 1.

According to various embodiments, the one or more microphones 10 may be disposed adjacent to a rear seat HH to collect voice generated from an occupant in the rear seat HH.

However, the one or more microphones 10 may be provided without limitation as long as the microphone 10 may acquire a voice signal from the occupant seated in the rear seat HH. For example, the one or more microphones 10 may be provided in a terminal device (e.g., a rear seat entertainment system (RSE)) provided at a rear side of a driver seat and/or a terminal device provided at a rear side of the passenger seat.

As another example, the one or more microphones 10 may include a microphone provided at a door side of a left rear seat LH, and a microphone provided at a door side of a right rear seat RH.

According to various embodiments, the one or more microphones 10 may include a first microphone provided adjacent to the left rear seat LH, and a second microphone provided adjacent to the right rear seat RH.

In this case, the controller 50 may be configured to identify a sound generation location on the basis of first audio data acquired by the first microphone and second audio data acquired by the second microphone. Specifically, the controller 50 may be configured to identify the sound generation location on the basis of a time difference between a sound signal received by the first microphone and a sound signal received by the second microphone.

However, the number of microphones 10 and the positions of the one or more microphones are not limited.

The audio data acquired from the one or more microphones 10 may be transmitted to the controller 50.

According to various embodiments, the one or more microphones 10 may include a directional microphone. The directional microphone refers to a microphone configured to selectively collect only the sound with a small angle transmitted in a particular direction. The sound generation location may be easily recognized by using the directional microphone.

For example, the one or more microphones 10 may include a left directional microphone configured to selectively receive only the sound transmitted from the left rear seat LH, and a right directional microphone configured to selectively receive only the sound transmitted from the right rear seat RH.

As described below, the controller 50 may be configured to identify a position of a speaker who makes a sound at the rear seat HH on the basis of a result of processing the audio data received from the one or more microphones 10.

The rear camera 20 may have a visual field directed toward a rear side of the vehicle 1 and acquire a rear image.

For example, the rear camera 20 may be installed on a rear wind shield of the vehicle 1. However, the rear camera 20 may be provided at any position without limitation as long as the rear camera 20 has a visual field directed toward the rear side of the vehicle 1.

The rear camera 20 may capture an image of the rear side of the vehicle 1 and acquire rear image data of the vehicle 1. The rear image data may include information on another vehicle positioned behind the vehicle 1 and/or information on a lane.

The rear camera 20 may include a plurality of lenses and a plurality of image sensors. The image sensor may include a plurality of photodiodes configured to convert light into electrical signals. The plurality of photodiodes may be disposed in a two-dimensional matrix.

The rear camera 20 may be electrically connected to the controller 50. For example, the rear camera 20 may be connected to the controller 50 through a communication network for a vehicle, connected to the controller 50 through a hard wire, or connected to the controller 50 through a printed circuit board (PCB). Therefore, the rear camera 20 may transmit the rear image of the vehicle 1 to the controller 50.

The one or more rear seat cameras 30 may have a visual field directed toward the rear seat HH of the vehicle 1 and acquire a rear seat image.

The one or more rear seat cameras 30 may be provided in the vehicle 1. The one or more rear seat cameras 30 in the vehicle 1 may have the visual field directed toward the rear seat HH of the vehicle 1 and acquire rear seat image data of the vehicle 1. The rear seat image data may include information on the occupant and/or baggage positioned in the rear seat HH of the vehicle 1.

The rear-seat camera 30 may include a plurality of lenses and a plurality of image sensors. The image sensor may include a plurality of photodiodes configured to convert light into electrical signals. The plurality of photodiodes may be disposed in a two-dimensional matrix.

The rear-seat camera 30 may be electrically connected to the controller 50. For example, the rear-seat camera 30 may be connected to the controller 50 through a communication network for a vehicle, connected to the controller 50 through a hard wire, or connected to the controller 50 through a printed circuit board (PCB). Therefore, the rear-seat camera 30 may transmit the rear-seat image of the vehicle 1 to the controller 50.

The one or more rear-seat cameras 30 may include a single rear-seat camera having a visual field directed toward the left rear seat LH and the right rear seat RH. For example, the one or more rear-seat cameras 30 may include the single rear-seat camera having the visual field directed toward the left rear seat LH and the right rear seat RH and configured to acquire the rear-seat image. In this case, the rear-seat camera 30 may be provided on, but not limited to, the room mirror 61.

According to various embodiments, the one or more rear-seat cameras 30 may include a left-rear-seat camera having a visual field directed toward the left rear seat LH and configured to acquire a left-rear-seat image, and a right-rear-seat camera having a visual field directed toward the right rear seat RH and configured to acquire a right-rear-seat image.

In this case, the one or more rear-seat images acquired from the one or more rear-seat cameras 30 may include a left-rear-seat image and a right-rear-seat image.

For example, the terminal device (e.g., RSE) provided at the rear side of the driver seat may include the left-rear-seat camera. The terminal device provided at the rear side of the passenger seat may include the right-rear-seat camera. However, the positions of the left-rear-seat camera and the right-rear-seat camera may not be limited thereto.

The input part 40 may be configured to receive various types of user inputs for setting the function of the vehicle 1 from the user. For example, the input part 40 may be provided as a tact switch, a joystick, a push switch, a slide switch, a toggle switch, a micro-switch, or a touch screen. According to various embodiments, the input part 40 may be provided on a steering wheel.

According to various embodiments, the input part 40 may receive a user input that turns on a rear-seat observation function, turns on a selective rear-seat observation function, or turns off a rear-seat observation function.

For example, the user may turn on the rear-seat observation function by pushing, once, a first button related to the rear-seat observation function. The user may turn on the selective rear-seat observation function by pushing the first button once more in the state in which the rear-seat observation function may be turned on. The user may turn off the rear-seat observation function by pushing the first button once more in the state in which the selective rear-seat observation function may be turned on. However, the user input for turning on/off the rear-seat observation function and the selective rear-seat observation function may not be limited thereto.

According to various embodiments, the input part 40 may include various types of interfaces for performing various types of settings related to the rear-seat observation function.

The user input received through the input part 40 may be transmitted to the controller 50. The controller 50 may perform an operation corresponding to the user input.

The controller 50 may include the at least one memory configured to store a program that performs the above-mentioned operations and the following operations, and at least one processor configured to execute the stored program. The memory and the processor included in the controller 50 may be integrated on a single chip or physically separated.

According to various embodiments, the controller 50 may identify the position of the speaker on the basis of a result of processing the audio data acquired from the one or more microphones 10.

The controller 50 may include an STT (speech to text) engine configured to convert the audio data, which may be inputted through the one or more microphones 10, into text information, and a dialogue manager configured to determine a user intention included in a speaking instruction by analyzing the text. The dialogue manager may recognize the user intention corresponding to the audio data by applying natural language understanding to the text.

Therefore, the controller 50 may identify whether the audio data inputted through the one or more microphones 10 may be naturally generated sound or voice of the person.

In case the one or more microphones 10 include the directional microphone, the controller 50 may identify the position of the speaker, who speaks, based on the sound received from the directional microphone.

In case the first directional microphone, which may be one component of the one or more microphones 10, has an angle directed toward the left rear seat LH, the controller 50 may identify that the speaker may be positioned in the left rear seat LH on the basis that the sound collected through the first directional microphone corresponds to the voice of the person.

In addition, in case the second directional microphone, which may be one component of the one or more microphones 10, has an angle directed toward the right rear seat RH, the controller may be configured to identify that the speaker is positioned in the right rear seat RH on the basis that the sound collected through the second directional microphone corresponds to the voice of the person.

In addition, the controller may be configured identify that at least two speakers may be respectively positioned in the left rear seat LH and the right rear seat RH on the basis that the audio data collected from the first directional microphone and the second directional microphone corresponding to the voice of the person.

In case the one or more microphones 10 include the plurality of microphones 10, the controller 50 may be configured to identify the position of the speaker on the basis of the sound collected from the first microphone and the sound collected from the second microphone installed to be spaced apart from the first microphone.

Specifically, the controller 50 may be configured to identify a distance from the first microphone or the second microphone to the sound generation location on the basis of the comparison between a point in time at which the audio data corresponding to the sound collected from the first microphone may be received and a point in time at which the audio data corresponding to the sound collected from the second microphone may be received.

In case the plurality of microphones 10 includes at least three microphones as described above, the controller 50 may identify the position of the speaker who speaks in the vehicle 1.

According to various embodiments, the controller 50 may be configured to identify the position of the speaker in the vehicle 1 on the basis of the rear-seat image acquired from the one or more rear-seat cameras 30.

To this end, the controller 50 may include an image processor configured to process an image.

In the embodiment, the controller 50 may be configured to recognize a face of at least one occupant included in the rear-seat image. More specifically, the controller 50 may be configured to perform image pre-processing on the rear-seat image. The image pre-processing process may include one or more processes of processing the rear-seat image in a shape more suitable for recognizing the face. For example, the image pre-processing processes may include a process of removing noise included in the rear-seat image, a process of increasing contrast of the rear-seat image, a deblurring process of removing blurs included in the rear-seat image, a process of removing a background region, a warping process of correcting distortion included in the rear-seat image, and a process of binarizing the rear-seat image.

The controller 50 be configured to detect a face region from the rear-seat image. For example, the controller 50 may detect the face region from the rear-seat image by using a Haar-based cascade adaboost classifier, a neural network-based classifier, a support vector machine, or the like. However, the scope of the embodiment may not be limited thereto. The controller 50 may detect the face region from the rear-seat image by using various face region detection technique(s).

The controller 50 may be configured to normalize the detected face region. In the embodiment, the controller 50 may detect facial landmarks of the face from the detected face region and normalize the face region based on the detected facial landmarks. For example, the controller 50 may detect the facial landmarks of the face from the face region by using an active contour model (ACM), an active shape model (ASM), an active appearance model (AAM), supervised descent method (SDM), or facial landmark detection technique based on the neural network or the like. The facial landmarks of the face may be facial landmarks for main facial portions. For example, the facial landmarks may be used to identify an eyebrow, an eye, a nose, a lip, a chin, an ear, a contour of the face, or the like. For example, the normalization may include an image cropping process of extracting a face image representing the face region from the rear-seat image, a process of matching positions of the facial landmarks detected from the face region with predefined reference positions, a process of adjusting a size of the extracted face region, and the like. For example, the face image extracted from the rear-seat image may have a shape of a patch image. The controller 50 may be configured to match the positions of the facial landmarks with the reference positions by performing affine transformation based on the positions of the detected facial landmarks. In this case, the affine transformation serves to allow a vector space, defined by the positions of the facial landmarks, to correspond to another vector space.

The controller 50 may be configured to identify the position of the speaker on the basis of changes in shapes of mouths in the faces of the occupants included in the rear-seat image.

For example, the controller 50 may be configured to identify the occupant positioned in the left rear seat LH as a speaker on the basis that the shape of the mouth of the occupant, who may be positioned in the left rear seat LH among the occupants included in the rear-seat image, may be changed to a critical degree or more. The controller 50 may be configured to identify the occupant positioned in the right rear seat RH as a speaker on the basis that the shape of the mouth of the occupant, who may be positioned in the right rear seat RH among the occupants included in the rear-seat image, may be changed to a critical degree or more.

In case the one or more rear-seat cameras 30 include the left-rear-seat camera and the right-rear-seat camera, the controller 50 may be configured to identify the occupant positioned in the left rear seat LH as a speaker on the basis that the shape of the mouth of the occupant included in the left-rear-seat image may be changed to a critical degree or more, and the controller 50 may identify the occupant positioned in the right rear seat RH as a speaker on the basis that the shape of the mouth of the occupant included in the right-rear-seat image may be changed to a critical degree or more.

According to various embodiments, the controller 50 may be configured to determine the position of the speaker by comparing the position of the speaker identified on the basis of the audio data acquired from the one or more microphones 10 and the position of the speaker identified on the basis of the rear-seat image acquired from the one or more rear-seat cameras 30.

For example, the controller 50 may be configured to determine the position of the speaker when the position of the speaker identified on the basis of the audio data and the position of the speaker identified on the basis of the rear-seat image may be coincident with each other. In contrast, the controller 50 may be configured to determine the position of the speaker as an unknown position when the position of the speaker identified on the basis of the audio data and the position of the speaker identified on the basis of the rear-seat image may be different from each other.

The controller 50 may be configured to control the display part 60 on the basis of the position of the speaker identified on the basis of the one or more rear-seat images, the audio data, and/or the user input received through the input part 40.

The display part 60 may be provided on the room mirror 61 installed in the vehicle 1. The room mirror 61 may be disposed above the dashboard of the vehicle 1 and output the rear image acquired from the rear camera 20.

For example, the display part 60 may display, in real time, the rear image acquired from the rear camera 20 when power may be applied to the rear camera 20 on the basis that the vehicle 1 is turned on.

That is, the controller 50 may be configured to control the display part 60 to display the rear image on the basis that the rear image may be received from the rear camera 20.

In this case, the controller 50 may be configured to process the rear image so that the rear image may be matched with the size of the display part 60, and the controller 50 may control the display part 60 to output the processed rear image.

The display part 60 may include a liquid crystal display (LCD) panel, a light emitting diode (LED), and/or an organic light emitting diode (OLED).

The driver may recognize a situation of a rear road while watching the rear image displayed on the display part 60 provided on the room mirror 61.

According to various embodiments, the display part 60 may not be only provided on the room mirror 61, but also provided on a component such as an audio, visual, navigation (ANN) device and/or a cluster that may be included in a visual field region of the driver. In addition, the display part 60 may be implemented as a head-up display.

As described below, the controller 50 may be configured to control the display part 60 to display not only the rear image but also the rear-seat image acquired from the one or more rear-seat cameras 30 on the basis that a preset condition may be satisfied.

For example, the controller 50 may be configured to control the display part 60 so that the rear-seat image overlaps the rear image.

According to the present disclosure, the driver may recognize a situation of a rear road while watching the rear image displayed on the display part 60 provided on the room mirror 61 or the component in the visual field region and recognize a situation of the rear seat HH while watching the rear-seat image.

The driver assist system 70 may include a smart cruise control system, a lane keeping assist system, a lane following assist, a lane departure warning system, a forward collision avoidance (FCA) system, a driver state monitoring (DSM) system, or the like.

The lane keeping assist system, the lane following assist system, and/or the lane departure warning system may determine whether the vehicle 1 deviates from the lane by using a sensor such as a front camera. The forward collision avoidance (FCA) system may determine a risk of a collision with a preceding vehicle by using the sensor such as the front camera or a radar. The driver state monitoring (DSM) system may determine the state of the driver on the basis of a driver image acquired from a camera configured to capture an image of the driver.

Although not illustrated in the drawings, the vehicle 1 may further include a driver-seat camera having a visual field directed toward the driver seat.

The driver auxiliary system 70 may transmit a warning signal to the controller 50 on the basis that the vehicle 1 deviates from the lane, a risk of a collision with a preceding vehicle may be a preset critical value or more, or the state of the driver may be determined as a drowsy state and/or a careless state.

In addition, the driver auxiliary system 70 may include a plurality of vehicle sensors. For example, the plurality of vehicle sensors may detect a vehicle speed of the vehicle 1, a steering angle, frequency of a braking operation and/or an operation of an accelerator pedal.

The driver assist system 70 may transmit the warning signal to the controller 50 on the basis that the acceleration of the vehicle 1 is a preset value or more, a degree of a change in steering angle of the vehicle 1 per time is a preset value or more, or the frequency of the braking operation and/or the operation of the accelerator pedal is a preset value or more.

Figure 3:
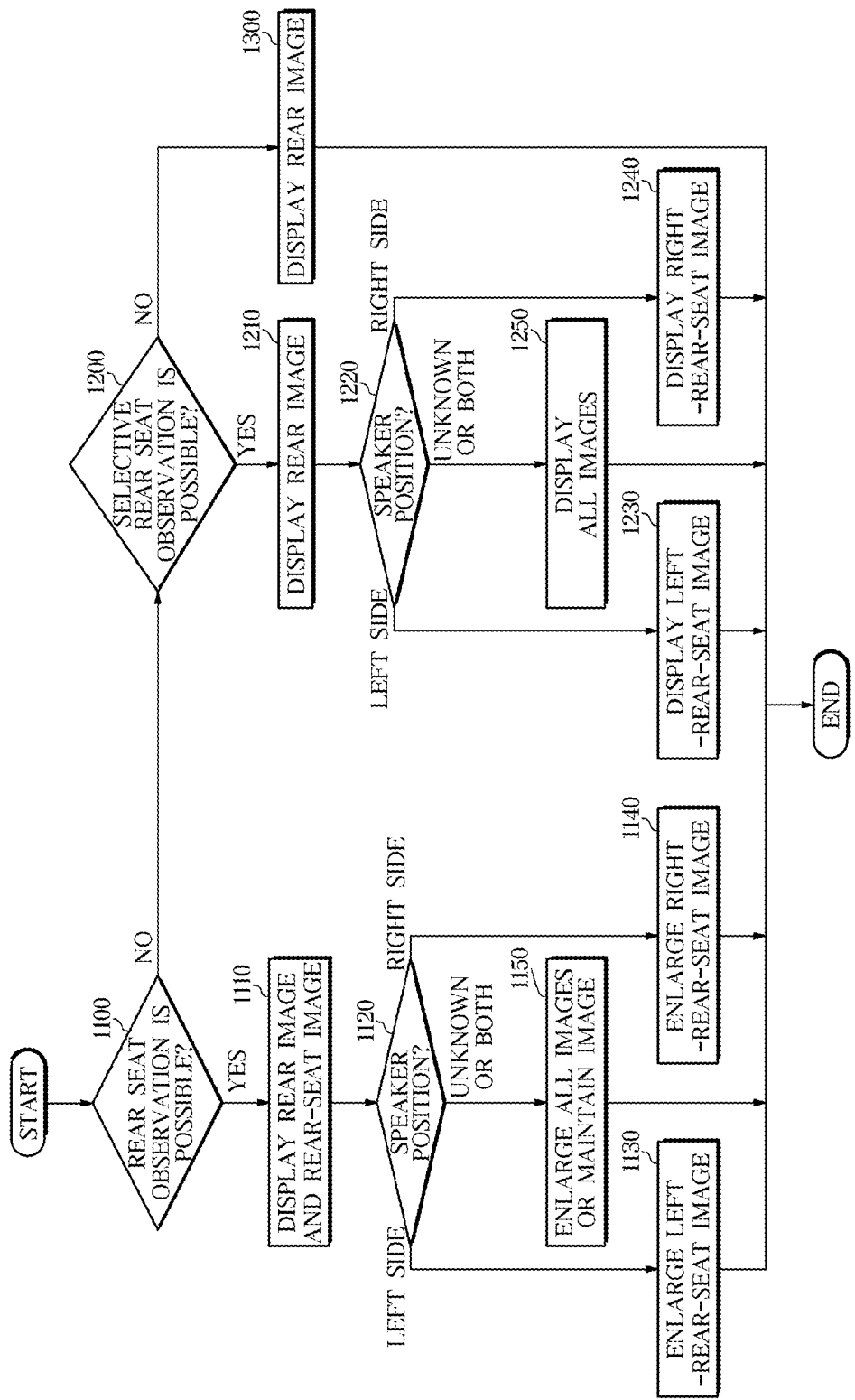
FIG. 3 is a flowchart illustrating an example of a method of controlling a vehicle according to the embodiment.

FIG. 3 is a flowchart illustrating an example of a method of controlling a vehicle according to the embodiment.

Referring to FIG. 3, the vehicle 1 according to the embodiment may display the rear image on the display part 60. That is, the display part 60 may display the rear image.

For example, the display part 60 may display, in real time, the rear image acquired from the rear camera 20 on the basis that the vehicle 1 may be turned on, and power may be applied to the rear camera 20.

According to various embodiments, the vehicle 1 may operate in a plurality of modes related to images to be displayed on the display part 60.

To this end, the input part 40 may receive a user input for selecting the plurality of modes. For example, the user may turn on the rear-seat observation function by selecting, once, a button related to the rear-seat observation function in the state in which the rear-seat observation function may be turned off. The user may turn on the selective rear-seat observation function by selecting the button once more in the state in which the rear-seat observation function may be turned on. The user may turn off the rear-seat observation function by selecting the button once more in the state in which the selective rear-seat observation function may be turned on.

However, an example in which the user turns on or off the rear-seat observation function and/or the selective rear-seat observation function through the input part 40 may not be limited thereto.

The vehicle 1 according to the embodiment may further include an indicator for indicating whether the rear-seat observation function may be operated. The indicator may flicker to inform the user of whether the rear-seat observation function may be turned on, the selective rear-seat observation function may be turned on, or the rear-seat observation function may be turned off.

The controller 50 may be configured to control the display part 60 to display the rear image regardless of the on/off state of the rear-seat observation function.

Therefore, the driver may observe, in real time, a situation of a rear road at the rear side of the vehicle 1 by using the room mirror 61.

Figure 4:
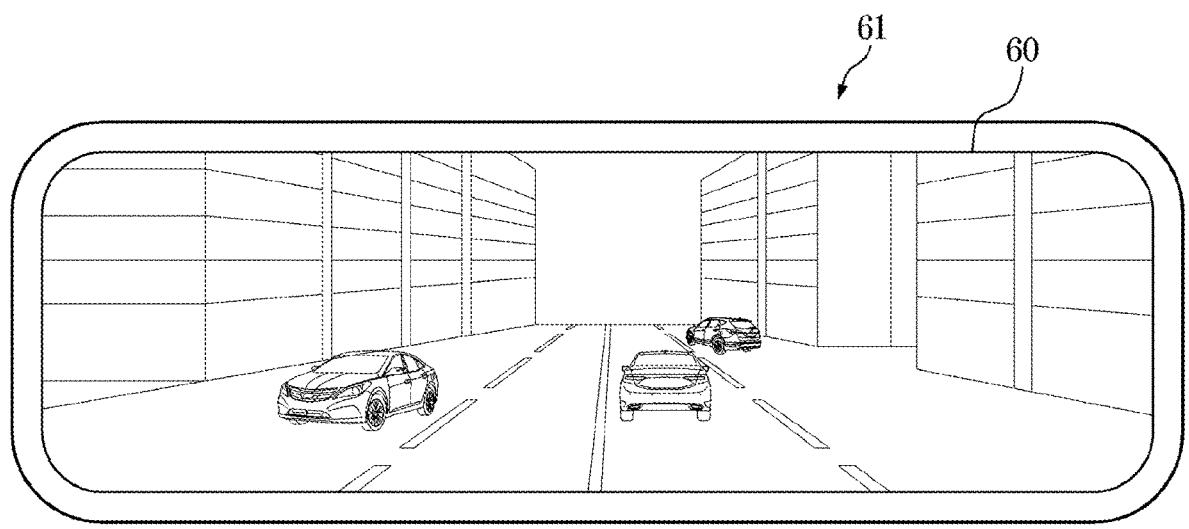
FIG. 4 is a view illustrating a state in which a rear image is displayed on a room mirror provided in the vehicle according to the embodiment.

FIG. 4 is a view illustrating a state in which the rear image may be displayed on the room mirror provided in the vehicle according to the embodiment.

Referring to FIG. 4, it may be ascertained that the rear image acquired from the rear camera 20 may be displayed on the display part 60 of the room mirror 61.

The configuration in which only the rear image may be displayed on the display part 60 means that the rear image may be displayed on the display part 60, whereas the one or more rear-seat images may not be displayed on the display part 60.

In case the only rear image is displayed on the display part 60, the driver may recognize the situation of the rear road through the room mirror 61.

The controller 50 may be configured to control the display part 60 to display only the rear image on the basis that the rear-seat observation function may be turned off (NO in 1100 and NO in 1200) (1300).

That is, the display part 60 may display only the rear image in case the rear-seat observation function may be turned off.

According to various embodiments, the controller 50 may be configured to control the display part 60 to display all the rear image and the one or more rear-seat images on the basis that the preset condition may be satisfied (e.g., YES in 1100).

For example, the controller 50 may be configured to control the display part 60 to display all the rear image and the one or more rear-seat images on the basis that the rear-seat observation function may be turned on (YES in 1100) by the user input.

In case the single rear-seat camera 30 having a visual field directed toward the left rear seat LH and the right rear seat RH may be provided in the vehicle 1, the one or more rear-seat images may include a single rear-seat image.

The single rear-seat image may include both the appearance of the left rear seat LH and the appearance of the right rear seat RH.

When the occupant seated in the rear seat HH may be detected from the single rear-seat image, the controller 50 may be configured to crop the face image of the occupant from the rear-seat image and control the display part 60 to display the face image of the occupant.

That is, the displaying of the rear-seat image may include cropping the face image of the at least one occupant included in the rear-seat image, and displaying the cropped face image of the at least one occupant.

For example, assuming that a first occupant may be seated in the left rear seat LH and a second occupant may be seated in the right rear seat RH, the controller 50 may be configured to crop the face image of the first occupant from the single rear-seat image, crop the face image of the second occupant, and control the display part 60 to display the face image of the first occupant and the face image of the second occupant.

In this case, the face image of the first occupant may be defined as the left-rear-seat image, and the face image of the second occupant may be defined as the right-rear-seat image.

Meanwhile, in case the left-rear-seat camera having the visual field directed toward the left rear seat LH may be provided in the vehicle 1 and the right-rear-seat camera having the visual field directed toward the right rear seat RH may be provided in the vehicle 1, the one or more rear-seat images may include the left-rear-seat image and the right-rear-seat image.

When the occupant seated in the left rear seat LH may be detected from the left-rear-seat image, the controller 50 may be configured to crop the face image of the occupant from the left-rear-seat image and display the display part 60 to display the face image of the occupant.

In addition, when the occupant seated in the right rear seat RH may be detected from the right-rear-seat image, the controller 50 may be configured to crop the face image of the occupant from the right-rear-seat image and control the display part 60 to display the face image of the occupant.

That is, the displaying of the rear-seat image may include cropping the face image of the occupant included in the left-rear-seat image, displaying the cropped face image of the occupant, cropping the face image of the occupant included in the right-rear-seat image, and displaying the cropped face image of the occupant.

The displaying of the rear-seat image may further include displaying the left-rear-seat image acquired by the left-rear-seat camera and/or the right-rear-seat image acquired by the right-rear-seat camera.

Figure 5:
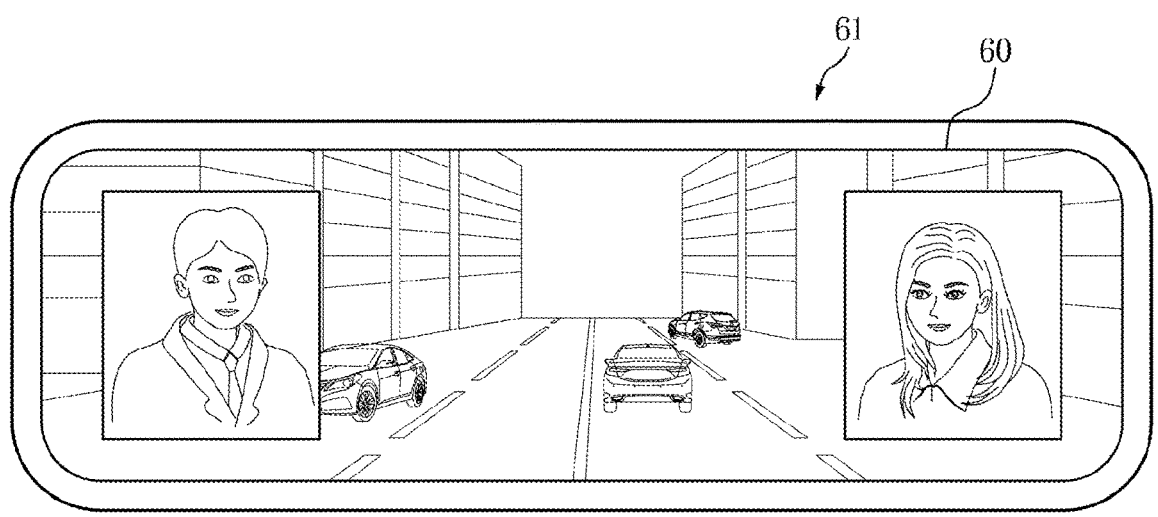
FIG. 5 is a view illustrating a state in which both a left-rear-seat image and a right-rear-seat image are displayed on the room mirror provided in the vehicle according to the embodiment.

FIG. 5 is a view illustrating a state in which both the left-rear-seat image and the right-rear-seat image may be displayed on the room mirror provided in the vehicle according to the embodiment.

Referring to FIG. 5, the display part 60 may display all the rear image and the one or more rear-seat images in response to a control signal of the controller 50.

For example, the one or more rear-seat images may be displayed while overlapping the rear image.

According to various embodiments, the display part 60 may display the left-rear-seat image in a left region of the display part 60 and display the right-rear-seat image in a right region of the display part 60.

FIG. 5 illustrates the situation in which both the left-rear-seat image and the right-rear-seat image may be displayed on the display part 60. However, at least one of the left-rear-seat image and the right-rear-seat image may be displayed on the display part 60.

For example, the controller 50 may be configured to control the display part 60 to display only the left-rear-seat image together with the rear image on the basis that the occupant may be determined as being seated only in the left rear seat LH between the left rear seat LH and the right rear seat RH.

As another example, the controller 50 may be configured to control the display part 60 to display only the right-rear-seat image together with the rear image on the basis that the occupant may be determined as being seated only in the right rear seat RH between the left rear seat LH and the right rear seat RH.

The controller 50 may be configured to determine the presence or absence of the occupant in the rear seat HH on the basis of a result of processing the one or more rear-seat images. However, the controller 50 may be configured to determine the presence or absence of the occupant in the rear seat HH on the basis of sensor data acquired by various vehicle sensors such as a seat sensor configured to measure a weight of the occupant in the rear seat HH or a scanning sensor (e.g., a radar sensor or an ultrasonic sensor) configured to identify the occupant in the rear seat HH.

According to various embodiments, the controller 50 may be configured to turn on only the left-rear-seat camera between the left-rear-seat camera and the right-rear-seat camera on the basis that the occupant may be determined as being seated only in the left rear seat LH between the left rear seat LH and the right rear seat RH.

In addition, the controller 50 may be configured to turn on only the right-rear-seat camera between the left-rear-seat camera and the right-rear-seat camera on the basis that the occupant may be determined as being seated only in the right rear seat RH between the left rear seat LH and the right rear seat RH.

In addition, the controller 50 may be configured to turn on both the left-rear-seat camera and the right-rear-seat camera on the basis that the occupants may be seated in all the left rear seat LH and the right rear seat RH.

In the state in which the rear image and the one or more rear-seat images may be displayed on the display part 60, the controller 50 may be configured to identify the position of the speaker among the occupants seated in the rear seat HH.

According to various embodiments, the controller 50 may be configured to identify the position of the speaker in the vehicle 1 on the basis of at least one of the audio data received from the one or more rear-seat images or the one or more microphones 10.

For example, the controller 50 may be configured to identify the speaker, who speaks among the occupants seated in the rear seat RH, based on the audio data received from the one or more microphones 10.

Specifically, in case the left directional microphone, which selectively receives only the sound transmitted from the left rear seat LH, acquires the voice signal of the occupant, the controller 50 may identify the occupant, who may be seated in the left rear seat LH among the occupants seated in the rear seat HH, as a speaker.

In addition, in case the right directional microphone, which selectively receives only the sound transmitted from the right rear seat RH, acquires the voice signal of the occupant, the controller 50 may be configured to identify the occupant, who may be seated in the right rear seat RH among the occupants seated in the rear seat HH, as a speaker.

In addition, in case the voice signal of the occupant may be acquired by both the left directional microphone and the right directional microphone, the controller 50 may identify all the occupants seated in the rear seat HH as speakers.

As another example, in case the first microphone provided to be close to the left rear seat LH acquires the voice signal before the second microphone phone provided to be close to the right rear seat RH acquires the voice sigma, the controller 50 may be configured to identify the occupant, who may be seated in the left rear seat LH among the occupants seated in the rear seat HH, as a speaker.

In addition, in case the second microphone phone provided to be close to the right rear seat RH acquires the voice signal before the first microphone provided to be close to the left rear seat LH acquires the voice signal, the controller 50 may be configured to identify the occupant, who may be seated in the right rear seat RH among the occupants seated in the rear seat HH, as a speaker.

In addition, in the case the first microphone provided close to the left rear seat LH and the second microphone phone provided close to the right rear seat RH acquire different voice sitmals, the controller 50 may be configured to identify all the occupants seated in the rear seat HH as speakers.

As another example, the controller 50 may be configured to analyze the shapes of the mouths of the occupants seated in the left rear seat LH and the right rear seat RH on the basis of the result of processing the one or more rear-seat images. In case the voice signal may be acquired by the one or more microphones 10 and the shape of the mouth of the occupant seated in the left rear seat LH may be changed, the controller 50 may be configured to identify the occupant, who may be seated in the left rear seat LH among the occupants seated in the rear seat HH, as a speaker.

In addition, in case the voice signal may be acquired by the one or more microphones 10 and the shape of the mouth of the occupant seated in the right rear seat RH may be changed, the controller 50 may identify the occupant, who may be seated in the right rear seat RH among the occupants seated in the rear seat HH, as a speaker.

In addition, in case the voice signal may be acquired by the one or more microphones 10 and the shapes of the mouths of both the occupant seated in the left rear seat LH and the occupant seated in the right rear seat RH may be changed, the controller 50 may identify all the occupants seated in the rear seat HH as speakers.

According to the present disclosure, because the rear-seat image and the audio data may be used to identify the speaker, it may be possible to more accurately identify the speaker.

Figure 6:
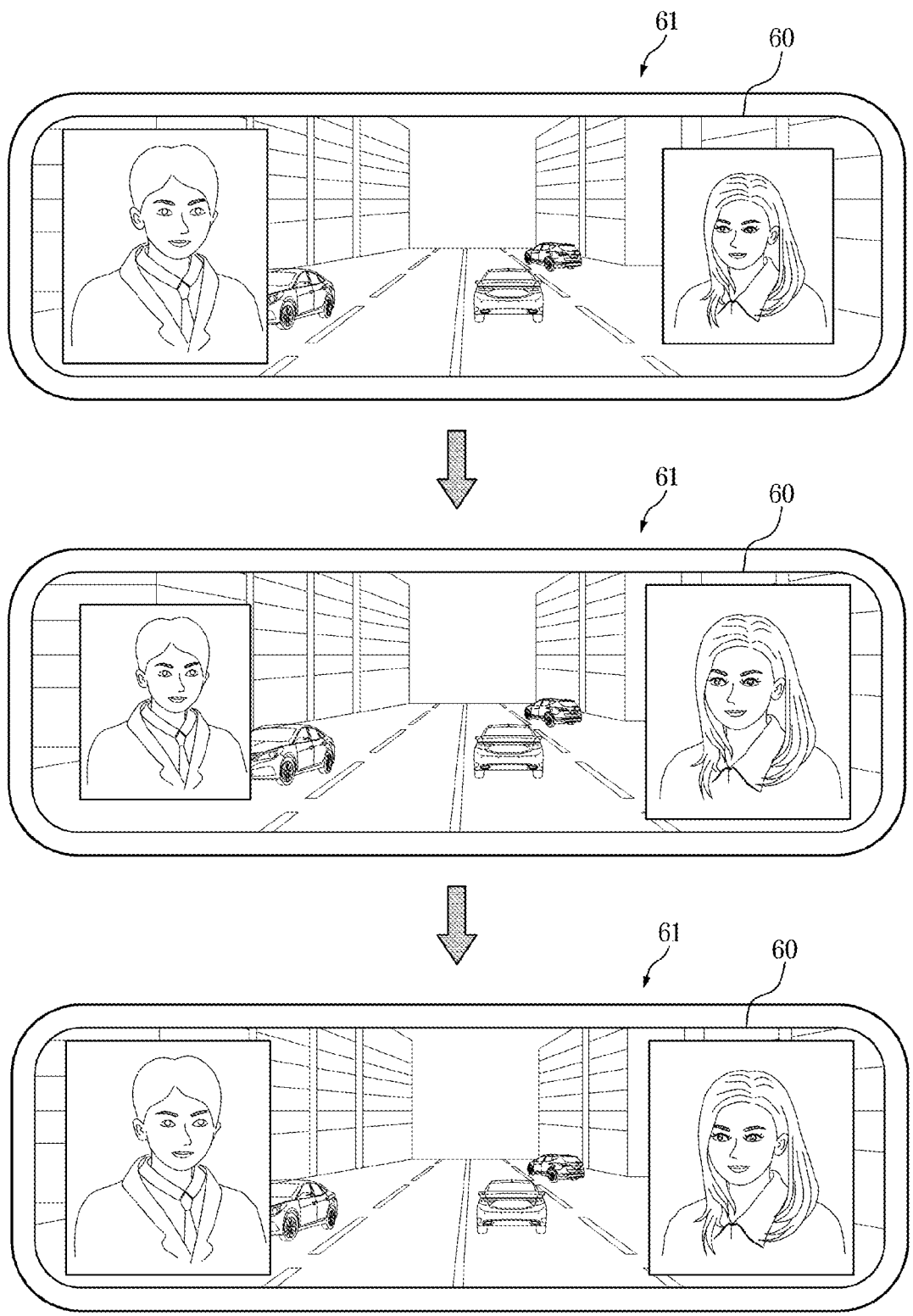

FIG. 6 is a view illustrating various examples of screens displayed on the room mirror in a state in which the rear-seat observation function may be turned on.

Referring to FIG. 6, the controller 50 may be configured to control the display part 60 to increase the size of the left-rear-seat image on the basis that the speaker may be identified as being positioned in the left rear seat LH (left side of 1120) (1130).

For example, the controller 50 may be configured to control the display part 60 so that the size of the left-rear-seat image displayed on the display part 60 may be larger than the size of the right-rear-seat image disposed on the display part 60 on the basis that the speaker may be identified as being positioned in the left rear seat LH.

Meanwhile, the controller 50 may be configured to control the display part 60 to increase the size of the right-rear-seat image on the basis that the speaker may be identified as being positioned in the right rear seat RH (right side of 1120) (1140).

In addition, the controller 50 may be configured to control the display part 60 to increase the size of the left-rear-seat image and the size of the right-rear-seat image on the basis that the speakers may be identified as being positioned in the left rear seat LH and the right rear seat RH or the speaker may be identified as being positioned at an unknown position (UNKNOWN or BOTH of 1120) (1150).

According to the present disclosure, because the image of the occupant, who actually speaks among the occupants seated in the rear seat HE, may be enlarged, the driver may easily recognize the speaker.

As described above, in case the left-rear-seat camera and the right-rear-seat camera may be provided in the vehicle 1, the left-rear-seat image or the right-rear-seat image may mean the image acquired from the left-rear-seat camera or the image acquired from the right-rear-seat camera.

In addition, in case the left-rear-seat camera and the right-rear-seat camera may be provided in the vehicle 1, the left-rear-seat image or the right-rear-seat image may mean the face image of the occupant seated in the left rear seat LH cropped from the image acquired by the left-rear-seat camera or the face image of the occupant seated in the right rear seat RH cropped from the image acquired by the right-rear-seat camera.

In addition, in case the single rear-seat camera 30 may be provided in the vehicle 1, the left-rear-seat image or the right-rear-seat image may mean the face image of the occupant seated in the left rear seat LH cropped from the rear-seat image or the face image of the occupant seated in the right rear seat RH cropped from the rear-seat image.

That is, the controller 50 may be configured to crop the face image of the first occupant positioned in the left rear seat LH and the face image of the second occupant positioned in the right rear seat RH from the one or more rear-seat images. The controller 50 may be configured to control the display part 60 to increase the size of the face image of the first occupant on the basis that the speaker may be identified as being positioned in the left rear seat LH (left side of 1120) (1130). The controller 50 may be configured to control the display part 60 to increase the size of the face image of the second occupant on the basis that the speaker may be identified as being positioned in the right rear seat RH (right side of 1120) (1140).

In addition, the controller 50 may be configured to control the display part 60 to increase both the size of the face image of the first occupant and the size of the face image of the second occupant on the basis that the position of the speaker may not be identified or the speakers may be identified as being positioned in the left rear seat LH and the right rear seat RH (UNKNOWN or BOTH of 1120)(1150).

Meanwhile, the controller 50 may be configured to control the display part 60 to selectively display the one or more rear-seat images on the basis that the selective rear-seat observation function may be turned on (YES in 1200).

Figure 7:
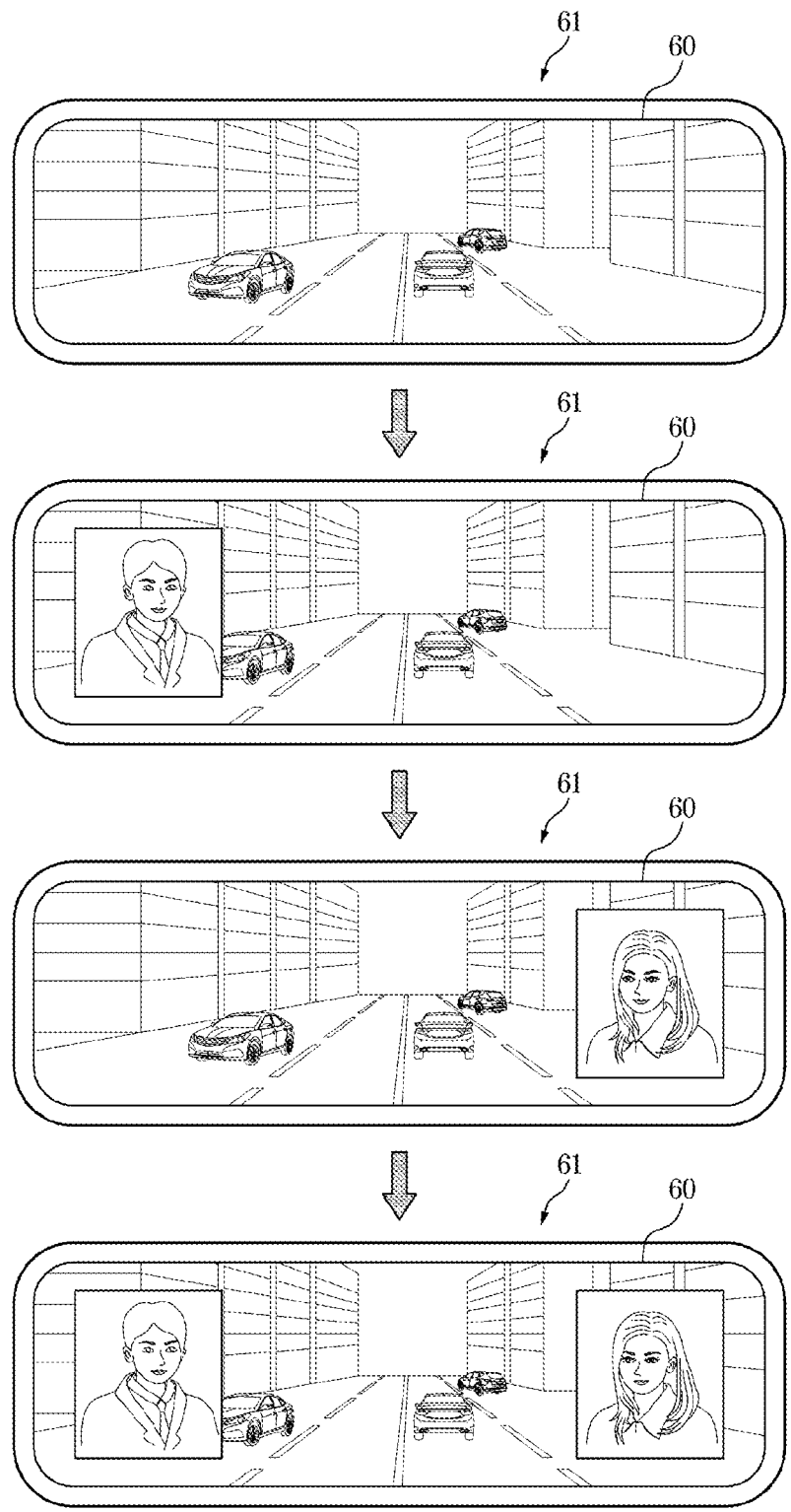

FIG. 7 is a view illustrating various examples of screens displayed on the room mirror in a state in which the selective rear-seat observation function may be turned on.

Referring to FIG. 7, the display part 60 may display only the rear image until a preset condition may be satisfied (1210).

The controller 50 may be configured to control the display part 60 to display the one or more rear-seat images together with the rear image in accordance with various conditions.

For example, the controller 50 may be configured to control the display part 60 to display the one or more rear-seat images on the basis that the occupant seated in the rear seat HH may be detected.

That is, the controller 50 may be configured to control the display part 60 to display the one or more rear-seat images only in case the occupant seated in the rear seat HH may be detected from the one or more rear-seat images.

For example, when the occupant seated in the rear seat HH may be detected from the one or more rear-seat images, the controller 50 may be configured to crop the face image of the occupant may control the display part 60 to display the face image of the occupant.

According to various embodiments, the controller 50 may be configured to determine whether to display the one or more rear-seat images on the basis of the position of the speaker.

For example, when the speaker may be identified as being positioned in the rear seat HH, the controller 50 may be configured to control the display part 60 to display all the rear image and the one or more rear-seat images.

According to various embodiments, the controller 50 may be configured to control the display part 60 to display the one or more rear-seat images only when the occupant seated in the rear seat HH speaks.

The controller 50 may be configured to control the display part 60 to display only the rear image and the left-rear-seat image on the basis that the speaker may be identified as being positioned in the left rear seat LH (left side of 1220) (1230), and the controller 50 may be configured to control the display part 60 to display only the rear image and the right-rear-seat image on the basis that the speaker may be identified as being positioned in the right rear seat RH (1240).

In addition, the controller 50 may be configured to control the display part 60 to display all the rear image, the left-rear-seat image, and the right-rear-seat image on the basis that the speakers may be identified as being positioned in the left rear seat LH and the right rear seat RH or the speaker may be identified as being positioned at an unknown position (UNKNOWN or BOTH of 1220) (1250).

That is, the controller 50 may be configured to control the display part 60 to display only the image of the speaker, who speaks among the occupants positioned in the rear seat HH in the state in which the selective rear-seat observation function operates.

As described above, in case the left-rear-seat camera and the right-rear-seat camera may be provided in the vehicle 1, the left-rear-seat image or the right-rear-seat image may mean the image acquired from the left-rear-seat camera or the image acquired from the right-rear-seat camera.

In addition, in case the left-rear-seat camera and the right-rear-seat camera may be provided in the vehicle 1, the left-rear-seat image or the right-rear-seat image may mean the face image of the occupant seated in the left rear seat LH cropped from the image acquired by the left-rear-seat camera or the face image of the occupant seated in the right rear seat RH cropped from the image acquired by the right-rear-seat camera.

In addition, in case the single rear-seat camera 30 may be provided in the vehicle 1, the left-rear-seat image or the right-rear-seat image may mean the face image of the occupant seated in the left rear seat LH cropped from the rear-seat image or the face image of the occupant seated in the right rear seat RH cropped from the rear-seat image.

According to the present disclosure, the rear-seat image may be displayed only in case the occupant seated in the rear seat HH speaks, such that the driver may concentrate on the rear image in case there may be no conversation.

In summary, the vehicle 1 according to the embodiment may display all the rear image and the one or more rear-seat images on the room mirror 61 in the state in which the rear-seat observation function operates, and the vehicle 1 may increase the size of the one or more rear-seat images displayed on the room mirror 61 in accordance with the position of the speaker.

In addition, the vehicle 1 according to the embodiment may display only the rear image on the room mirror 61 in the state in which the selective rear-seat observation function may be turned on, and the vehicle 1 may display the one or more rear-seat images together with the rear image on the room mirror 61 only when a preset condition may be satisfied.

In this case, the preset condition may include various conditions such as a condition in which the occupant may be detected in the rear seat HH and a condition in which the speaker may be detected in the rear seat HH.

Meanwhile, the vehicle 1 according to the embodiment may display only the rear image on the room mirror 61 when there may be no user's selection.

Figure 8:
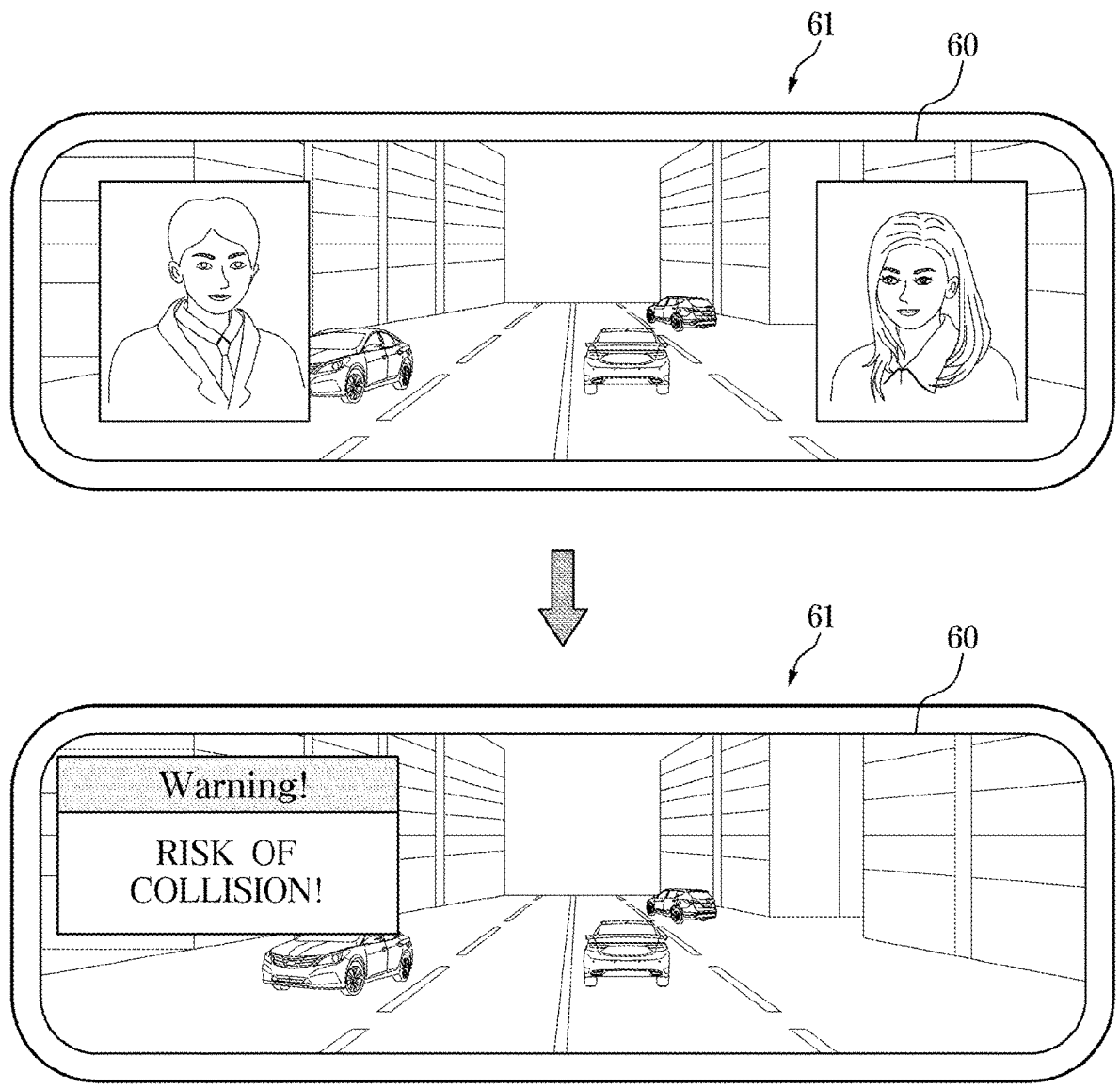
FIG. 8 is a view illustrating an example of a change in screen on the room mirror when an emergency situation of the vehicle occurs while the rear seat image is displayed on the room mirror.

FIG. 8 is a view illustrating an example of a change in screen on the room mirror when an emergency situation of the vehicle occurs while the rear seat image may be displayed on the room mirror.

Referring to FIG. 8, the output of the one or more rear-seat images may be stopped when an emergency situation occurs while the rear image and the one or more rear-seat images may be displayed on the display part 60 of the room mirror 61.

According to various embodiments, the controller 50 may be configured to control the display part 60 to stop the output of the one or more rear-seat images on the basis that the controller receives a warning signal from the driver assist system 70 while the display part 60 displays all the rear image and the one or more rear-seat images.

Further, in case the controller 50 receives the warning signal from the driver assist system 70, the controller 50 may be configured to control the display part 60 to output a visual notification (e.g., words, figure, etc.) for warning of an emergency situation.

According to the present disclosure, the driver, who may be being in conversation with the occupant seated in the rear seat HH, may quickly recognize and cope with the emergency situation.

According to the present disclosure, the rear-seat image may be displayed on the room mirror 61 that displays the rear image in accordance with the user's selection.

In addition, according to the present disclosure, the rear-seat image may be displayed on the room mirror 61 only when the occupant may be present in the rear seat HH.

In addition, according to the present disclosure, the rear-seat image may be displayed on the room mirror 61 only in case the occupant seated in the rear seat HH speaks.

In addition, according to the present disclosure, it may be possible to display only the image related to the occupant, who speaks, on the room mirror 61.

The user of the vehicle 1, to which the present disclosure may be applied, may easily observe the rear seat HH through the room mirror 61. Therefore, it may be expected that the satisfaction of use of the vehicle 1 will increase. For example, the driver with a child seated in the rear seat HH may identify the child seated in the rear seat HH through the room mirror 61.

Meanwhile, the constituent elements of the vehicle 1 may transmit and receive data through a vehicle communication network (e.g., CAN communication).

Meanwhile, some of the constituent elements of the vehicle 1 may be software components and/or hardware components such as a field programmable gate array (FPGA) and an application specific integrated circuit (ASIC).

On the other hand, the disclosed embodiments may be implemented in the form of a recording medium that stores computer-executable instructions. The instruction may be stored in the form of a program code. When the instruction may be executed by a processor, a program module may be generated, and operations of the disclosed embodiments may be performed. The recording medium may be implemented as a computer-readable recording medium.

Examples of the computer-readable recording medium include all kinds of recording media for storing instructions readable by a computer. Specific examples thereof may include a read only memory (ROM), a random access memory (RAM), a magnetic tape, a magnetic disc, a flash memory, an optical data storage device, and the like.

According to the present disclosure, the driver may communicate with the occupant seated in the rear seat.

In addition, according to the present disclosure, the driver may consistently observe the situation of the rear seat or concentratedly observe the situation of the rear road by using the display provided in the vehicle in accordance with the driver's intention.

In addition, according to the present disclosure, the driver may quickly recognize the occurrence of the emergency situation.

In addition, according to the present disclosure, the driver may identify the speaker who may be in conversation in the rear seat.

As described above, the embodiments have been described with reference to the accompanying drawings. A person skilled in the art may understand that the present disclosure may be carried out in other forms different from those disclosed in the embodiments without changing the technical spirit or the essential features of the present disclosure. The disclosed embodiments may be illustrative and should not be interpreted as being restrictive.

What is claimed is:

1. A vehicle comprising:
a rear camera having a field of view toward a rear side of the vehicle and configured to acquire a rear image;
a display configured to display the rear image;
a left rear-seat camera having a field of view toward a left rear-seat and configured to acquire a left rear-seat image;
a right rear-seat camera having a field of view toward a right rear-seat of the vehicle, and configured to acquire a right rear-seat image; and
a controller configured to control the display to display both the rear image and at least one of the left rear-seat image or the right rear-seat image based on a preset condition being satisfied;
wherein the left rear-seat image includes a face image of a first occupant positioned in the left rear seat and the right rear-seat image includes a face image of a second occupant positioned in the right rear seat;

wherein the controller is further configured to:
  crop the face image of the first occupant from the left rear-seat image and to crop the face image of the second occupant from the right rear-seat image;
  wherein the cropped face image of the first occupant and the cropped face image of the second occupant are displayed in distinct areas on the display;
  wherein the cropped face image of the first occupant is displayed in a left area of the display with the first occupant being identified, and the cropped face image of the second occupant is displayed in a right area of the display with the second occupant being identified; and
  adjust a display size of the cropped face image to enlarge the image of the occupant identified as a speaker.

2. The vehicle of claim 1, wherein the controller is further configured to control the display to display both the rear image and the at least one of the left rear-seat image or the right rear-seat image based on a rear-seat observation function that is turned on according to a user input.

3. The vehicle of claim 1, further comprising:
at least one microphone,
  wherein the controller is further configured to identify a position of a speaker in the vehicle based on at least one of (i) the at least one of the left rear-seat image or the right rear-seat image or (ii) audio data received from the at least one microphone.

4. The vehicle of claim 3, wherein the controller is further configured to control the display to display both the rear image and the at least one of the left rear-seat image or the right rear-seat image when the speaker is identified as being positioned in the rear seat.

5. The vehicle of claim 3,
  wherein the controller is further configured to control the display to display the left-rear-seat image and the right-rear-seat image,
  wherein the controller is further configured to control the display to increase a size of the left-rear-seat image based on the speaker being identified as being positioned in the left rear seat, and
  wherein the controller is further configured to control the display to increase a size of the right-rear-seat image based on the speaker being identified as being positioned in the right rear seat.

6. The vehicle of claim 3, wherein the controller is further configured to:
  control the display to display the face image of the first occupant based on the speaker being identified as being positioned in the left rear-seat, and
  control the display to display the face image of the second occupant based on the speaker being identified as being positioned in the right rear-seat.

7. The vehicle of claim 3,
  wherein the controller is further configured to control the display to increase a size of the face image of the first occupant based on the speaker being identified as being positioned in the left rear seat, and
  wherein the controller is further configured to control the display to increase a size of the face image of the second occupant based on the speaker being identified as being positioned in the right rear seat.

8. The vehicle of claim 1, wherein the controller is further configured to control the display to stop displaying the at least one of the left rear-seat image or the right rear-seat image based on a warning signal being received from a driver assist system while the display displays both the rear image and the at least one of the left rear-seat image or the right rear-seat image.

9. A method of controlling a vehicle, the method comprising:
  receiving a rear image from a rear camera having a field of view toward a rear side of the vehicle;
  displaying the rear image on a display;
  receiving a left rear-seat image from a left rear-seat camera having a field of view towards a left-rear seat;
  receiving a right rear-seat image from a right rear-seat camera having a field of view towards a right-rear seat; and
  controlling the display to display both the rear image and the-at least one of the left rear-seat image or the right rear-seat image based on a preset condition being satisfied;
  wherein the left rear-seat image includes a face image of a first occupant positioned in the left rear seat and the right rear-seat image includes a face image of a second occupant positioned in a right rear-seat; and
  wherein controlling of the display comprises:
    cropping the face image of the first occupant from the left rear-seat image and cropping the face image of the second occupant from the right rear-seat image;
    displaying the cropped face image of the first occupant and the cropped face image of the second occupant in distinct areas on the display;
    wherein the cropped face image of the first occupant is displayed in a left area of the display with the first occupant being identified and the cropped face image of the second occupant is displayed in a right area of the display with the second occupant being identified; and
  adjusting a display size of the cropped face image to enlarge the image of the occupant identified as a speaker.

10. The method of claim 9, wherein the controlling of the display part to display both the rear image and the at least one of the left rear-seat image or the right rear-seat image comprises controlling the display to display both the rear image and the at least one of the left rear-seat image or the right rear-seat image based on a rear-seat observation function being turned on according to a user input.

11. The method of claim 9, further comprising:
  identifying a position of a speaker in the vehicle based on at least one of (i) the at least one of the left rear-seat image or the right rear-seat image or (ii) audio data received from at least one microphone.

12. The method of claim 11, wherein the controlling of the display to display both the rear image and the at least one of the left rear-seat image or the right rear-seat image comprises controlling the display to display both the rear image and the at least one of the left rear-seat image or the right rear-seat image based on the speaker being identified as being positioned in the rear seat.

13. The method of claim 11,
  wherein the controlling of the display to display both the rear image and the at least one of the left rear-seat image or the right rear-seat image comprises:
    controlling the display to display the left-rear-seat image and the right-rear-seat image;
    controlling the display to increase a size of the left-rear-seat image based on the speaker being identified as being positioned in the left rear-seat; and controlling the display to increase a size of the right-rear-seat image based on the speaker being identified as being positioned in the right rear-seat.

14. The method of claim 11, wherein the controlling of the display to display both the rear image and the at least one of the left rear-seat image or the right rear-seat image comprises:
controlling the display to display the face image of the first occupant based on the speaker being identified as being positioned in the left rear-seat; and
controlling the display to display the face image of the second occupant based on the speaker being identified as being positioned in the right rear-seat.

15. The method of claim 11, wherein the controlling of the display to display both the rear image and the at least one of the left rear-seat image or the right rear-seat image comprises:
controlling the display to display the face image of the first occupant and the face image of the second occupant;
controlling the display to increase a size of the face image of the first occupant based on the speaker being identified as being positioned in the left rear seat; and
controlling the display to increase a size of the face image of the second occupant based on the speaker being identified as being positioned in the right rear seat.

16. The method of claim 9, further comprising:
controlling the display to stop displaying the at least one of the left rear-seat image or the right rear-seat image based on a warning signal being received from a driver assist system while the display displays both the rear image and the at least one of the left rear-seat image or the right rear rear-seat image.

* * * * *